United States Patent [19]
Raggi

[11] Patent Number: 4,463,487
[45] Date of Patent: Aug. 7, 1984

[54] METHOD OF MANUFACTURING PISTON RINGS

[75] Inventor: Lodovico Raggi, Milan, Italy

[73] Assignee: Associated Engineering Italy S.p.A., Turin, Italy

[21] Appl. No.: 259,188

[22] Filed: Apr. 30, 1981

[51] Int. Cl.³ ............................................. B23P 15/06
[52] U.S. Cl. .................................. 29/156.63; 29/558; 82/40 R; 82/45
[58] Field of Search ................... 29/156.63, 156.6, 558, 29/27 C, 223; 51/290, 324, 227 R; 82/40 R, 45

[56] References Cited

U.S. PATENT DOCUMENTS

| | | | |
|---|---|---|---|
| 831,151 | 9/1906 | Gaeth | 29/156.63 |
| 1,561,336 | 11/1925 | McGlenn | 29/156.63 |
| 2,377,960 | 6/1945 | Phillips | 29/156.63 |
| 2,530,615 | 11/1950 | Hutto | 51/290 |
| 2,741,017 | 4/1956 | Junker | 29/156.63 |
| 3,323,808 | 6/1967 | Newhouser | 82/40 R |
| 4,125,043 | 11/1978 | Leutgab | 82/45 |
| 4,154,555 | 5/1979 | Skrentner | 29/27 C |

FOREIGN PATENT DOCUMENTS

| | | | |
|---|---|---|---|
| 330999 | 12/1920 | Fed. Rep. of Germany | 29/223 |
| 887029 | 8/1953 | Fed. Rep. of Germany | 29/223 |
| 692904 | 6/1953 | United Kingdom | 29/156.6 |
| 709246 | 5/1954 | United Kingdom | 29/156.63 |

Primary Examiner—Daniel C. Crane
Attorney, Agent, or Firm—Mawhinney & Mawhinney & Connors

[57] ABSTRACT

The manufacture of piston rings for internal combustion engines comprises making a ring blank of which the diameter over the outer periphery is greater, and the diameter within the inner periphery is less than that required in the finished ring. A gap is cut in the ring blank to afford two free ends and the ring blank is held in a closed position by the application of a force only to each of the free ends of the ring blank. One or more ring blanks are then clamped in a closed position and machined so that the inner and outer peripheries are circular. This enables a ring to be produced which conforms very closely to a required shape and which thus, in use, provides a good seal between a piston and the associated cylinder of an internal combustion engine.

7 Claims, 18 Drawing Figures

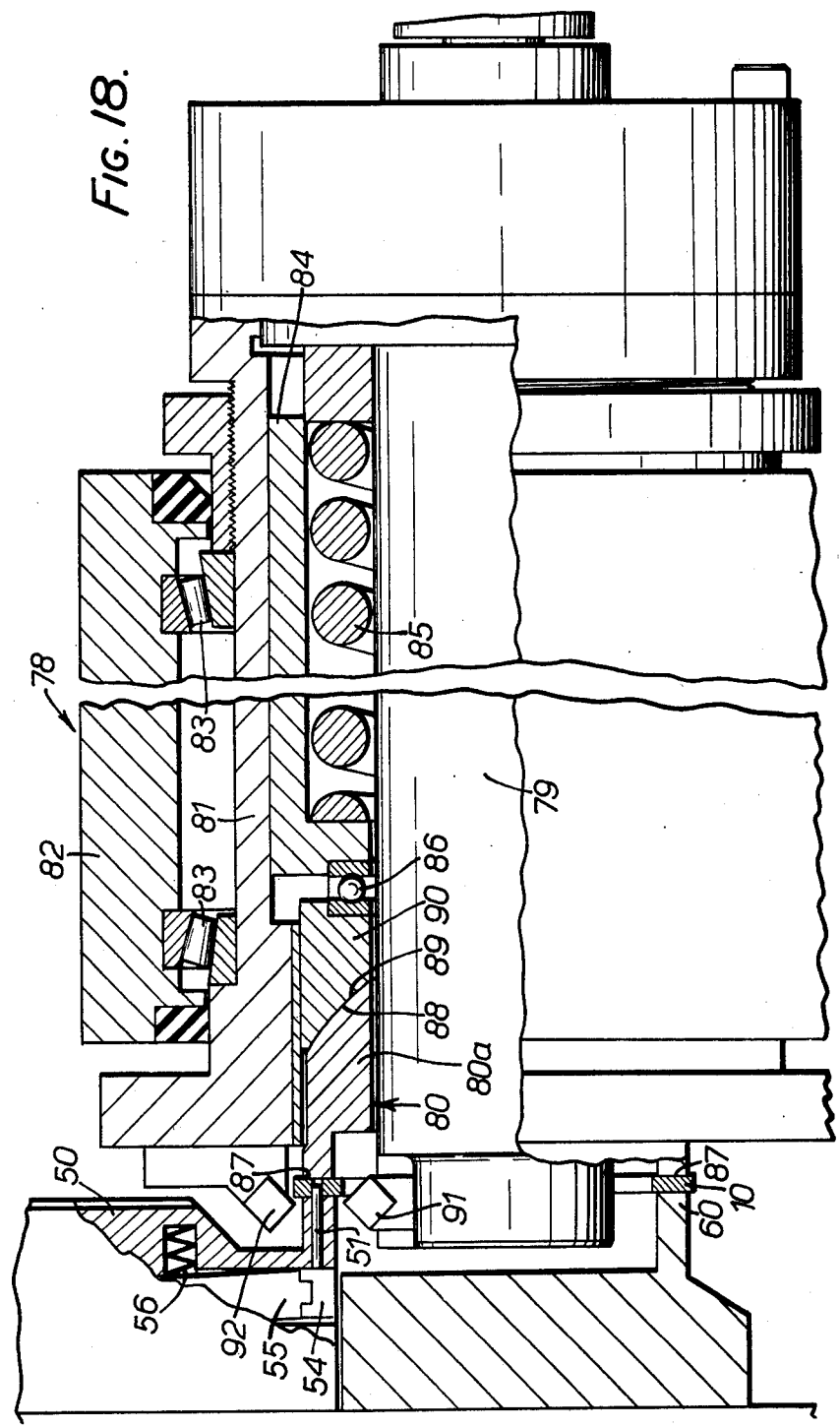

METHOD OF MANUFACTURING PISTON RINGS

BACKGROUND OF THE INVENTION

Field of the Invention

This invention relates to piston rings for reciprocating engines or compressors and to methods of their manufacture.

It will be appreciated that when a piston ring, particularly (but not exclusively) a compression ring having a single gap, of either a plain rectangular cross-section or any other known or convenient cross-section, is installed in an engine, the outer periphery of the ring should be circular and should have an outward resilient load so that it maintains sealing contact with the cylinder bore around the entire periphery. When the ring and bore are new the gap should be small or substantially closed. It is also desirable that as the cylinder bore and/or piston ring wear during operation, the resilient sealing contact between the ring and the bore should be maintained around the entire periphery (although it will be obvious that as the diameter of the piston ring increases by say 0.5% of the diameter, the gap will increase correspondingly). Moreover, to promote good sealing and minimise friction, it is desirable for the outward resilient load to be as uniform as possible around the periphery.

In the following specification and claims, the term 'diameter' is used in relation to the inner and outer peripheries of a ring blank even though these peripheries of the ring blank may be precisely circular but may, prior to machining, be slightly oval or elliptical. Nevertheless these peripheries of the ring blank will be approximately circular and so the term 'diameter' will, for convenience, be used. Thus, references in the specification and claims to the 'diameter' of the ring blank are to be construed accordingly.

The term 'closed' as used herein in relation to the condition of a ring blank having a gap cut therein is defined as a condition of the ring blank in which the gap is reduced, as compared with a position of the ring blank when the ring blank is unstressed by external forces, or in which the free ends are lightly in abutment with one another. In most cases, however, there is still a small gap between the free ends in the 'closed' condition. The finished ring when contracted to fit into a cylinder bore may be in a 'closed' condition, as defined.

The term 'circular' as used herein in relation to the machining of a clamped ring blank or blanks is to be construed as meaning circular within the tolerances of which the means used for machining are capable.

DISCUSSION OF THE PRIOR ART

Hitherto, in order to solve this problem, pison rings have been made by one of two methods, which may be outlined as follows:

In the first method the piston ring is machined to have both its inner and outer diameters circular before cutting the gap; the gap is then cut and the piston ring is heat formed by placing it on a mandrel and subjecting it to a high temperature so that the ring is expanded within its elastic limit to have a "permanent set." The extent of this is that on assembly of the piston ring in an engine with the gap closed, the outer diameter is circular and the ring has an inherent resilient load which maintains it in contact with the cylinder bore.

The second known method is to turn the piston ring before cutting the gap so that its inner and outer diameters have a predetermined non-circular form, usually determined by the shape of a cam on a machine of which the cutting tool follows the movement of the cam follower. A predetermined gap is then cut, so arranged that on assembly, when the gap is closed, the external periphery of the ring is circular and has an outward resilient load.

The latter method has the disadvantage that the calculations of the non-circular form assume that the material is homogeneous, and in practice this is not always so.

It has been proposed in British Patent Specification No. 709,246 to provide a machine for forming a piston ring, comprising a device having a plurality of rollers adapted to be spaced round the outer periphery of the ring blank for constricting and holding the ring blank, and a grinding wheel for grinding the outer perpheral surface of the ring blank. This machine has many serious disadvantages. Firstly, the free ends are not maintained at the same predetermined distance apart throughout the machining step. Secondly, instead of the ring blank between its free ends being allowed to take its natural form, allowing for internal stresses and non-homogeneity of the material, it is constricted by a number of, e.g. twelve, spaced rollers, so that the periphery will have a small but significant waviness, with a smaller radius at the point of contact of the rollers and a larger radius between the rollers. Thirdly, the ring blank is not clamped between clamping members against its parallel faces, to prevent it from moving while being machined. Fourthly, the ring blank in this prior art is ground to size progressively around the periphery; therefore the part of the ring which has been ground, and which therefore has a smaller radius than the part not yet ground, must move in an outward direction to maintain contact with the rollers. This implies that the centre of the ring blank moves progressively, as the ring blank is moved round to bring successive positions of its circumference into position to be ground; but unless the centre of the ring blank remains in the same portion, the grinding of the periphery will not result in a ring of which the outer surface is a true circle.

It is an object of the invention to mitigate or overcome these disadvantages.

SUMMARY OF THE INVENTION

According to a first aspect of the invention there is provided a method of manufacture of a piston ring, including the steps of making a ring blank of which the diameter over the outer periphery is greater, and the diameter within the inner periphery is less than that required in the finished ring, cutting a gap in the ring blank to afford two free ends, holding the ring blank in a closed position by the application of a force only to each of the free ends of the ring blank, clamping one or more of said ring blanks in a closed position, and then machining the inner and outer peripheries to be circular.

According to a second aspect of the invention there is provided a method comprising drilling a hole simultaneously and then extending the two pins simultaneously.

According to a third aspect of the invention there is provided a method of manufacture of a piston ring, including the steps of making a ring blank of which the diameter over the outer periphery is greater, and the diameter within the inner periphery is less than that required in the finished ring, cutting a gap in the ring blank to afford two free ends, holding the ring blank in a closed position by the application of a force only to each of the free ends of the ring blank, clamping one or more ring blanks in a closed position between the stationary clamping member and an annular clamping member forming part of a machining head, the machining head being movable towards the ring blank or blanks to bring the annular clamping member into engagement with the or a ring blank to clamp the ring blank or blanks, and then machining simultaneously the interior and exterior peripheries of the clamped ring blank or blanks to be circular, by respective boring and turning tools carried on respective inner and outer parts of the machining head, said inner and outer parts of the machining head being coaxial with, and arranged respectively within and outside the annular clamping member, being movable axially relative to said annular clamping member, after the annular clamping member has engaged the ring blank or blanks and being rotatable relative to the annular clamping member to perform said machining step.

According to a fourth aspect of the invention there is provided apparatus for the manufacture of a piston ring, including means for holding a ring blank having two free ends formed by the cutting of a gap in the ring blank, the ring blank having a diameter over the outer periphery which is greater than, and a diameter within the inner periphery which is less than that required in the finished ring, the holding means applying a force only to each of the free ends of the ring blank to hold the ring blank in a closed position, means for clamping one or more of said ring blanks and means for machining the clamped ring blank or blanks so that the inner and outer peripheries of the ring blank or blanks are circular.

According to a fifth aspect of the invention there is provided apparatus for the manufacture of a piston ring from a ring blank having a diameter over the outer periphery which is greater than, and a diameter within the inner periphery which is less than that required in the finished ring blank having two free ends formed by the cutting of a gap in the ring blank, the apparatus comprising means for holding the two free ends of the ring blank in a closed position by the application of a force only to each of the free ends of the ring blank, a machining head having an annular clamping member and being for movement towards the ring blank to bring the annular clamping member into engagement with the side face of the ring blank to clamp the side faces of the ring blank between said annular member and a stationary clamping member to clamp the ring blank in a closed position, the machining head also including inner and outer parts carrying respective boring and turning tools, said inner and outer parts being coaxial with, and arranged respectively within and outside, the annular clamping member, being movable axially relatively to said annular clamping member, after the annular clamping member has clamped the ring blank, to respective positions for commencement of machining and being rotatable relatively to the annular clamping member for perform said machining step.

According to a sixth aspect of the invention there is provided apparatus wherein the annular clamping member includes a first annular portion having, at one free end, a face for engagement with a ring blank and having at an end opposite said one end a generally annular convexly pat-spherical surface whose centre lies in the plane of the face, and a second annular portion having at one end a concavely part-spherical surface with the same or substantially the same centre and radius of curvature as said convexly part-spherical surface and in engagement with said convexly part-spherical surface to provide a seating therefor which allows rational movement of the first cylindrical portion relatively to the second cylindrical portion.

According to a seventh aspect of the invention there is provided a piston ring for an internal combustion engine, the piston ring having a gap cut therein to afford two free ends and there being a hole in each free end and extending parallel to the axis of the piston ring.

BRIEF DESCRIPTION OF THE DRAWINGS

Some embodiments of the invention will now be specifically described, by way of example, with reference to the accompanying drawings, in which:

FIG. 18 is a side elevation, partly in cross-section, of a portion of the apparatus of FIGS. 13 to 17 and showing clamping means and a machining head of the apparatus.

DESCRIPTION OF THE PREFERRED EMBODIMENTS

In piston ring practice it is conventional to refer to the radial dimension of the ring as the thickness and the axial dimension of the ring as the width.

The ratio of diameter to thickness of a piston ring typically varies from 20:1 to 30:1 depending on the material.

Figure 1:
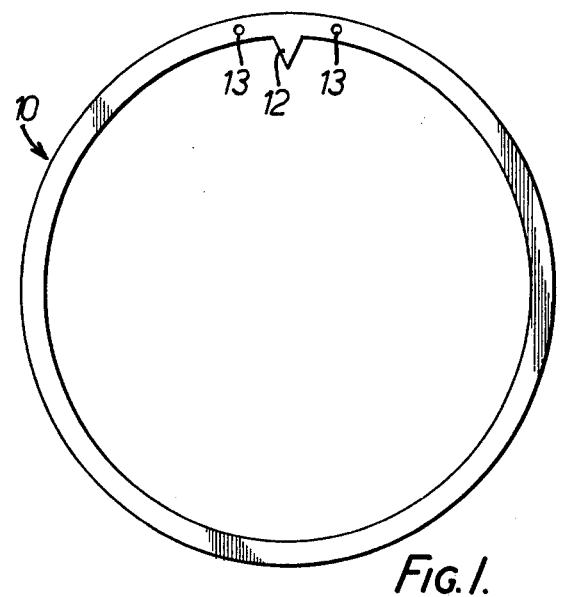
FIG. 1 is an elevation of a piston ring blank.

Referring first to FIG. 1, a typical piston ring 10 has, when finish machined, an outside diameter of 60 mm, a thickness of 2.5 mm and a width of 2 mm. It is shown and described as a compression ring of plain rectangular cross-section, though it may be of any of a large number of known or convenient cross-sections. The piston ring may be a compression or scraper ring, though it may also be, in suitable cases, an oil control ring, for example, a plain ring of a multi-piece oil control ring.

The ring blank may be cast, or produced by any known or convenient method and preferably has a small degree of ovality, though in certain cases—e.g. where the required gap is small—may be truly circular; the ring blanks thus produced will have a machining tolerance, the reason for which will become apparent; thus the outer diameter will be larger and the inner diameter smaller than the finished dimensions, each by, say, 1 mm. The ring blank may be formed with a notch or projection 12 at a point on its circumference, for the purpose of correctly orientating the ring blank for machining. The side faces 11 are then ground parallel to one another and to the required width.

In a first method of finishing a piston blank of this kind, the piston ring blank 10 (FIG. 1) is formed with two holes of 1 mm diameter through the entire width of the ring, for example by drilling; the holes 13 being at a predetermined distance apart. The holes 13 are drilled close to where the free ends of the ring will be, after a gap has been cut in the ring blank. Preferably, the two holes 13 are drilled before the gap is cut, so that the correct spacing of the holes 13 on the ring blank can readily be achieved. The holes 13 are on respective sides of the position where the gap is to be. This position is where the locating notch or similar feature 12 is formed on the blank.

Figure 2:
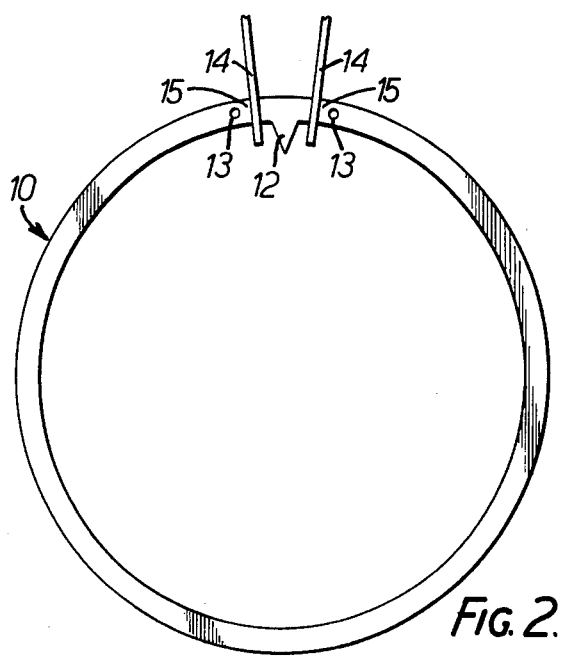
FIG. 2 is an elevation of the piston ring blank of FIG. 1 showing holes drilled in the ring and a gap being cut in the piston ring blank.

The gap is then cut, preferably by two circular saw blades 14 (FIG. 2), so as to leave the holes 13 symmetrically disposed in relation to free ends 15 and on the neutral axis of the ring. A plain gap is shown, though, as is well known, this may have different forms. Any notch or projection 12 is removed by this operation. However, if desired, the gap may be cut before drilling the holes.

Figure 3:
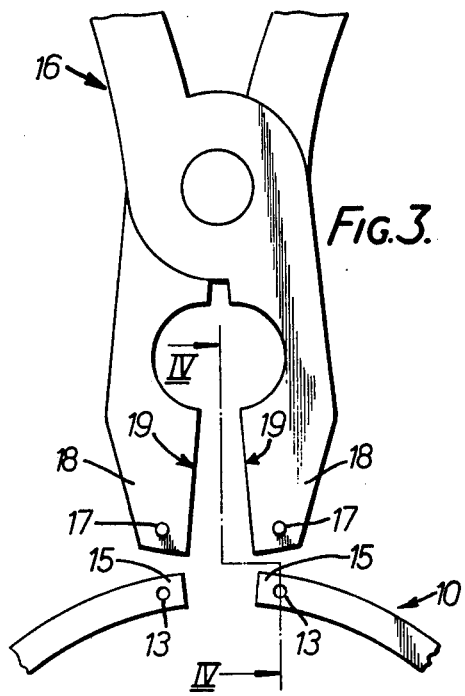
FIG. 3 is an elevation of a part of the piston ring blank of FIGS. 1 and 2 and of a manual tool for closing the piston ring blank.
Figure 4:
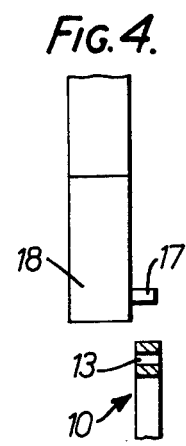
FIG. 4 is a section on the line IV—IV of FIG. 3.
Figure 5:
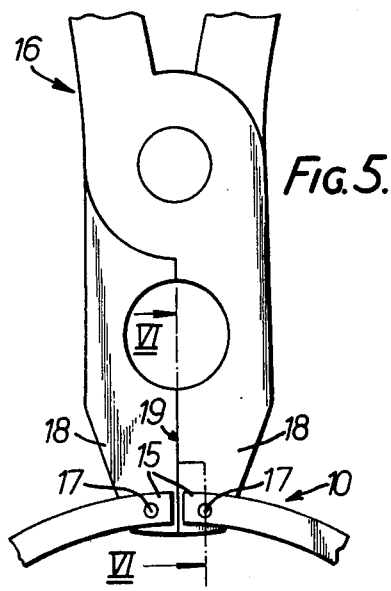
FIG. 5 is a similar view to FIG. 3 but showing the manual tool in engagement with the piston ring blank and the piston ring blank in a closed position.
Figure 6:
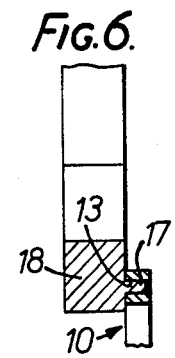
FIG. 6 is a section on the line VI—VI of FIG. 5.

A manual tool 16 (FIGS. 3 & 4), resembling a pair of pliers with two projecting parallel pins 17 extending from respective ends of jaws 18, has the pins 17 sized to fit in the 1 mm holes 13. The pins 17 are inserted in the holes 13 and the jaws 18 of the tool 16 are then closed to bring the free ends 15 of the ring blank 10 into the closed position (FIGS. 5 & 6). The distance apart of the two holes 13 in this position will be determined by means of co-operating stops 19 on the tool 16. It will be appreciated that both the forces applied to move the free ends 15 of the ring blank 10 to the closed position and the forces holding these ends in the closed position have no or substantially no radially directed components.

The ring 10 is then transferred from the manual tool 16 by sliding the ring 10 so that the holes 13 in the ring engage with two pins 20 on a plane face 21 of a part 22 of a lathe or equivalent machine, the pins 20 being spaced at the same predetermined distance apart as the spacing of the holes 13 when the ring is in the closed position (FIG. 8) so that the ring 10 is maintained in the closed position. The ring 10 is then centralised, by means of a male conical or part-conical member 23 (FIG. 7) engaging against one edge formed between one side face 11 and the inner periphery 24 of the ring 10. The ring 10 is then clamped in this predetermined position against the plane face 21 by a member 25 which is screwed onto a rod 27 and which has a plane face 26 engaging the other side face of the ring. The clamping force is provided by applying a tension through the rod 27 to member 25 by any convenient means, such as a piston and cylinder device. The conical member 23 is loaded against the ring by a spring 28 abutting the central part of member 25. The outer periphery 29 may then be turned to true circular form by rotation of ring 10 clamped between lathe parts 22, 25, relative to a cutting tool 30. The latter is traversed parallel to the axis of rotation by an amount at least equal to the width of the ring 10.

Following this, the ring 10 is unclamped and then centralised (FIG. 9) by a female conical member 31 engaging one edge formed between the outer periphery 29 machined in the previous operation and one side face 11; the ring 10 having its holes 13 either engaged on the same pins 20, or transferred by means of the manual tool described above with reference to FIGS. 3 to 6 to an identical pair of pins 20 formed on a part similar to part 22. As these parts may be identical, the same reference numerals will be used. The ring 10 is then clamped in this predetermined position against the plain face 21 by a member 32 having a plane face 33 engaging the other side face 11 of the ring.

The clamping force is provided by applying a tension through an annular sleeve 34 and links 35 to member 32 by any convenient means, such as a piston and cylinder device. The links 35 are disengageable from the sleeve 34 to allow loading of the ring 10. The conical member 31 is loaded against the ring by springs 36 abutting pockets 37 in member 32.

Next the inner periphery 24 is turned to true circular form by rotation of the ring 10, clamped between parts 22, 32, relative to cutting tool 38. The tool 38 is traversed in a direction parallel to the axis of rotation for a distance at least equal to the width of the ring.

Figure 8:
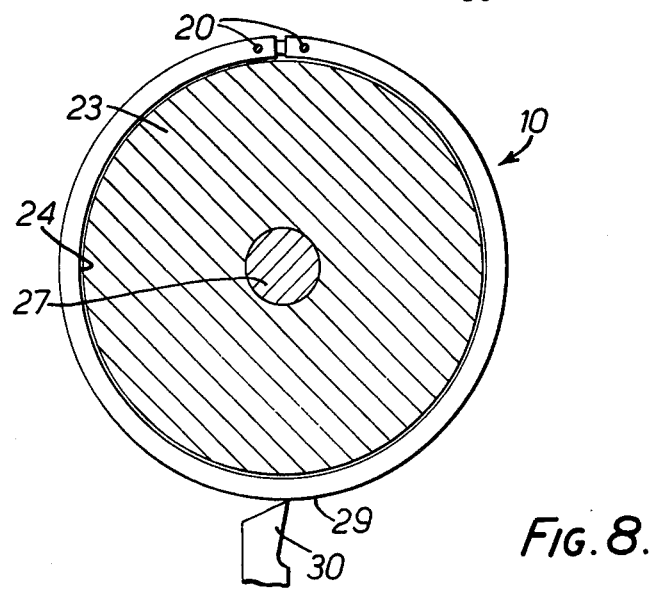
FIG. 8 is a section on the line VIII—VIII of FIG. 7.
Figure 9:
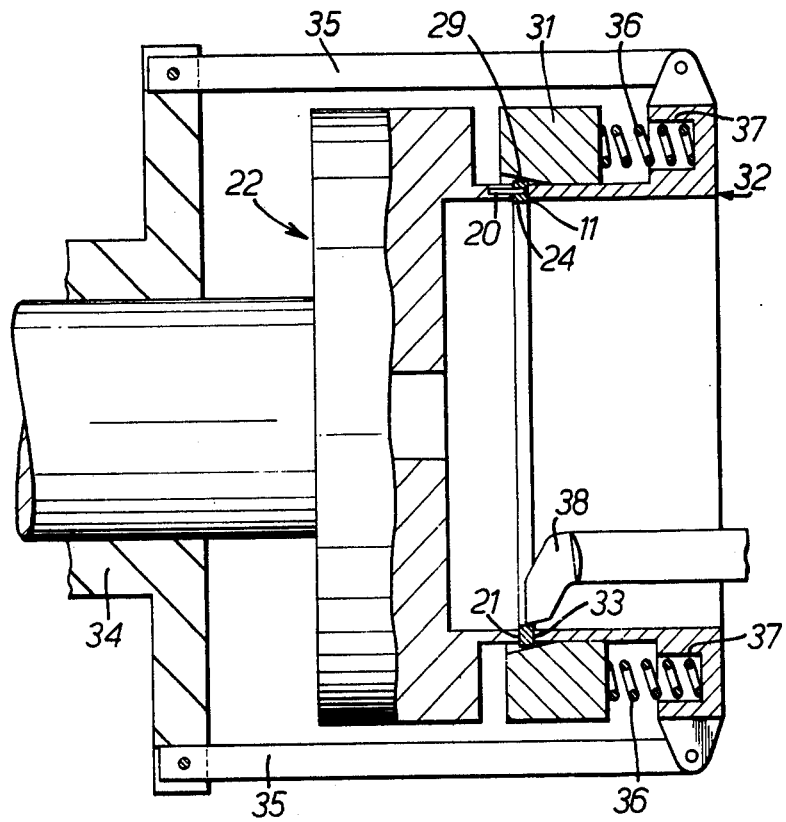
FIG. 9 is an elevation, partly in section, of a second part of the apparatus of FIGS. 7 and 8.

It will be clear that by mounting part 22 to rotate in good quality bearings, and by mounting the cutting tools 30, 38 on rigid supports, an accurately circular ring 10 should be produced. The absence of any substantial radially directed forces on the ring blank 10 before clamping ensures that there is no radial deformation of the ring blank 10 produced by such forces and tending to prevent true circularity being achieved. Moreover, since the outer periphery 29 is machined to be accurately circular in the first turning operation (FIG. 7 and 8) and since the member 31 is also accurately circular, the concentricity of the inner periphery 24 with the outer periphery 29 should be good after the second turning operation (FIG. 9).

Figure 7:
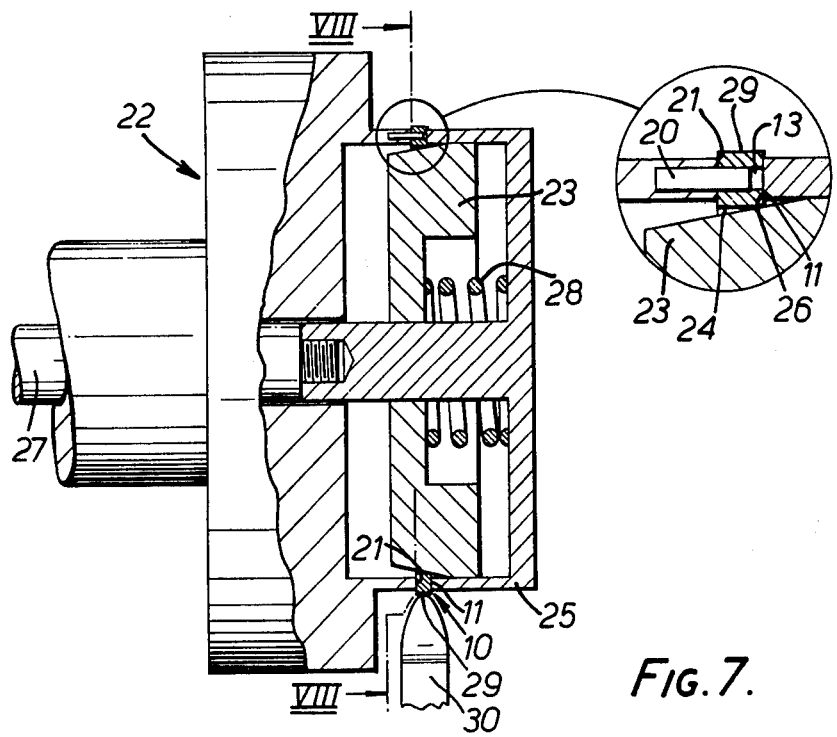
FIG. 7 is an elevation, partly in section, of one part of a first apparatus for machining a piston ring blank, a portion of said part being shown in greater detail in an inset.

However, because in the first turning operation the male conical member 23 contacts the inner periphery 24 in its unmachined state (i.e. its as-cast state when the blank is made by casing, or the as-sintered state when the blank is made by sintering), which is unlikely to be accurately circular, it is preferred to repeat the two operations of clamping the ring between parts 22, 25 and turning the outer periphery 29 as described with reference to FIG. 7 and then unclamping the ring, centering it within member 31, clamping it between members 22, 32, and then turning the inner periphery 24 in the manner described above; it is found that after the turning operations have been repeated the accuracy of the curvature of the ring is even better.

The inside periphery 29 may, of course, be machined before the outside periphery 24. Moreover, any so-called "features", that is grooves, steps, bevels, or other non-rectangular profiles in cross section of the ring will now be machined, preferably with the ring still mounted on the pins 20 and centralised and clamped in one of the two ways described above, as appropriate.

It will be evident that when the ring is freed from the machine, its free ends will move apart, increasing the gap, as a result of the resilience of the material.

Moreover, it will also be evident that, when the ring is installed in the engine, with the gap closed to the predetermined position, the outer diameter will be truly circular and of the correct dimension to fit in the cylinder bore.

Figure 10:
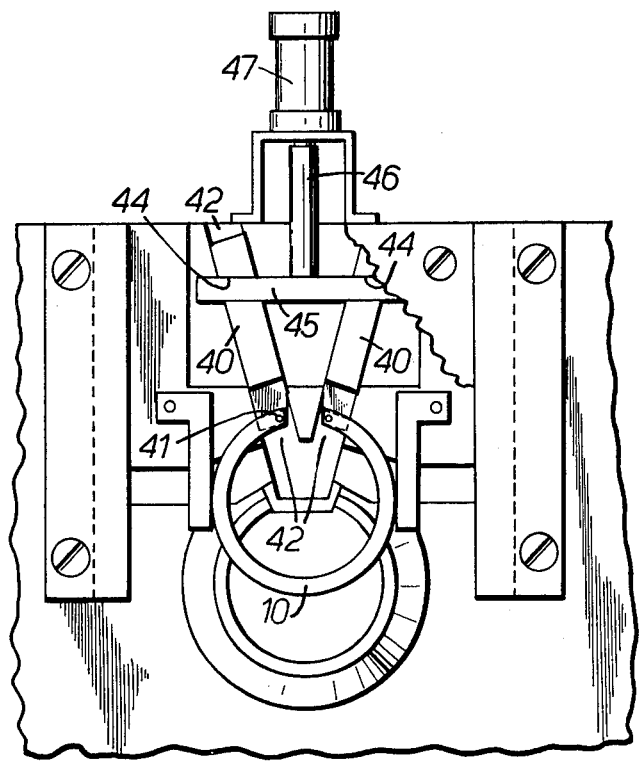
FIG. 10 is an elevation, partly cut away, of part of a second apparatus for machining piston ring blanks.
Figure 11:
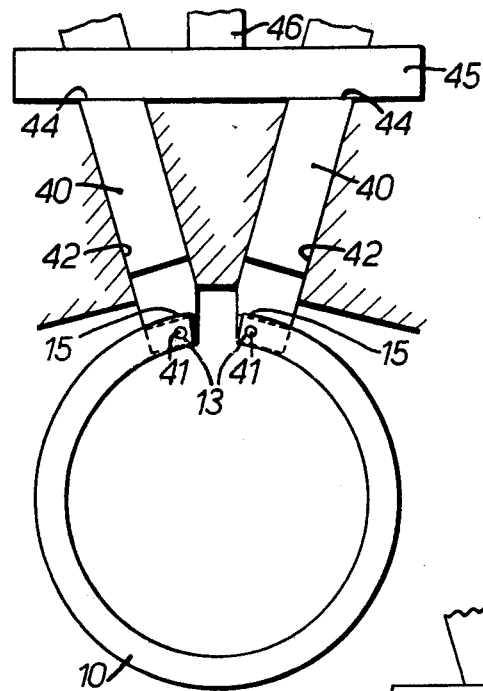
FIG. 11 is a simplified view of two slides of the apparatus of FIG. 10 and in one position.
Figure 12:
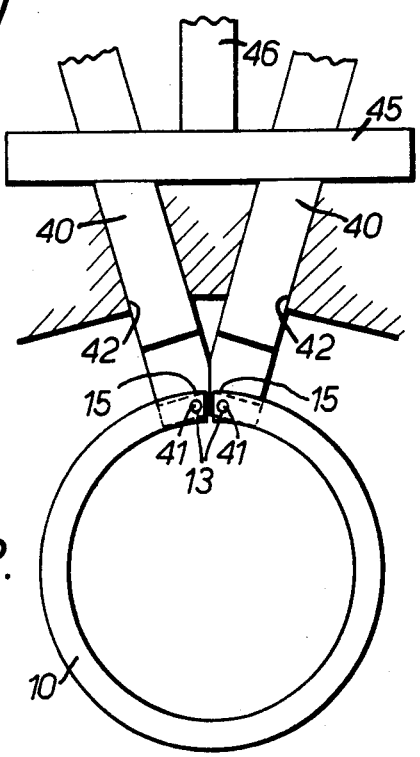
FIG. 12 is a similar view to FIG. 11 but with the two slides in another position.
Figure 14:
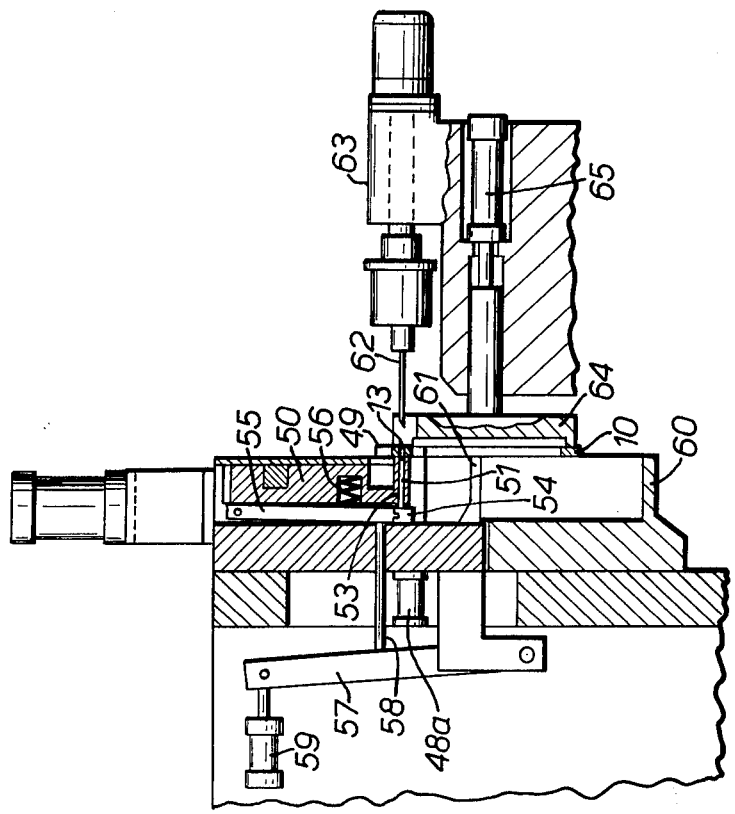
FIG. 14 is a cross-sectional view of the apparatus of FIG. 13 showing a drilling unit of the apparatus.

Referring next to FIGS. 10 to 12, instead of using a manual tool, the apparatus for the manufacture of the rings may include a pair of slides 40, each having a projecting pin 41 fixed to it, the slides being mounted to move in converging slideways 42.

In one position of the slides (see FIG. 11) the distance apart of the two pins 41 may be such that the ring blank 10, after the formation of the holes 13 and the gap in the manner described above with reference to the drawings, readily engages with the slides 40, by the two holes 13 engaging over the projecting pins 41. In this position, the ring 10 is unstressed by any external forces. The two slides 40 are then moved simultaneously in the converging slideways 42 by equal amounts to their second position (see FIG. 12), so that the free ends 15 of the ring blank 10 are still opposite one another and at equal radial from the centre, but have moved towards one another to a closed position in which the gap is reduced (or the free ends 15 are lightly in abutment with one another). As before, the pins 41 close the free ends 15 of the ring blank 10 and maintain the ring blank 10 in the closed position by applying forces to the ring blank which have no or substantially no radially-directed components.

The ring blank 10 may then be centralised, clamped and machined as described above.

With the slideways 42 symmetrically disposed on each side of a vertical plane, the motion of the two slides 40 may be synchronised by means of a horizontal bar 45 engaging in a corresponding groove 44 in the slides 40, a vertical arm 46 attached to the horizontal bar being raised or lowered by means of a suitable pneumatic ram 47. The bar 45 is trapped between the rear face of the casing in which the slideways 42 are formed and a cover plate, the front of the slides 40 being flush with the front of the bar 45.

In another embodiment illustrated in FIGS. 13 to 18, the ring blank 10 in full annular form (i.e. with no gap) may be loaded into a unit where it is initially located by resting on a projecting rod 48 (which may if desired engage with a notch 12 in the ring blank) and centralised by means of two symmetrically-disposed ways or guides 49. The unit may also comprise a pair of slides 50 in converging slideways 52, substantially as described above with reference to FIGS. 10 to 12, apart from one important difference. The difference is that, instead of the slides having fixed pins 41, the pins 51 can be retracted and extended through guide bore 53 in the slides 50. For this purpose, the pins 51 are attached to pivoted end portions 54 of pivoted levers 55. The latter are loaded by springs 56 to the position in which the pins 51 ar retracted, and may be moved by means of further levers 57 and pins 58 to the position in which the pins 51 are extended. Extension of the pins 51 is effected by means of an actuator 59 acting on the levers 57.

Figure 13:
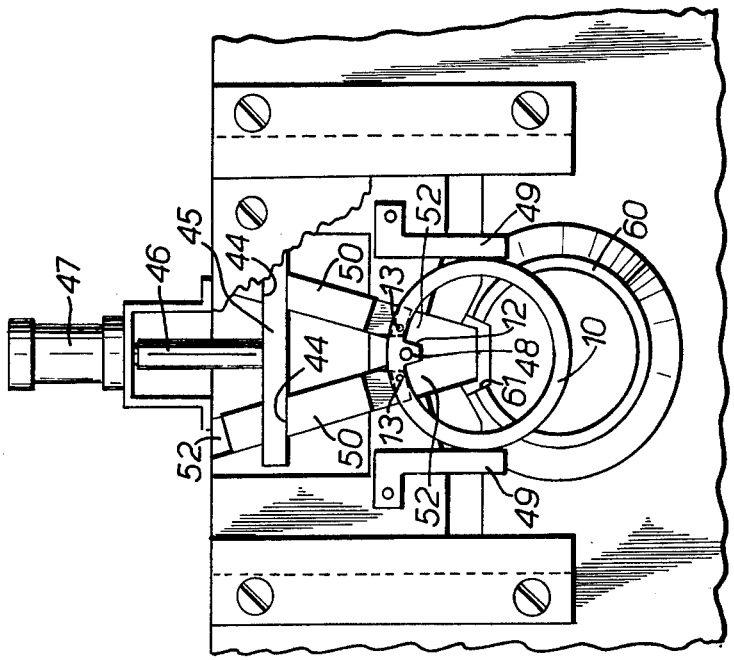
FIG. 13 is an elevation, partly cut away, of part of a third apparatus for machining piston ring blanks.

The unit has a base 60 which is substantially annular, and has the same mean radius and slightly smaller thickness than the required finished dimensions of the ring, but has a cut-out portion 61 at the top (see FIG. 13). The surface of the base 60 is co-planar with the surface of the ends of the slides 50 in which the guide bores 53 are formed.

The axes of rotation of two drills 62 are aligned with the axes of the guide bores 53. The drills 62 are driven in any convenient manner, and the drilling unit 63 incorporates a ring blank clamping plate 64 and an associated actuator 65, which clamps the ring blank 10 against the surface of the base 60 and of the ends of the slides 50, before drilling. The drilling uint 63 is then advanced and operated, to drill two holes 13 in the ring blank 10 at a predetermined spacing, such that the holes 13 will be close to the free ends of the ring after a gap is cut, and approximately midway between its inner and outer peripheries. As the drills 62 are retracted, the actuator 59 is operated to cause the two pins 51 to extend, engaging one in each hole 13. To facilitate this, the pins 51 may be of slightly smaller diameter than that of the drills 62.

In this way, the problems of manually positioning the holes 13 of the ring blank over pins (e.g. 20, 41) are overcome.

Figure 16:
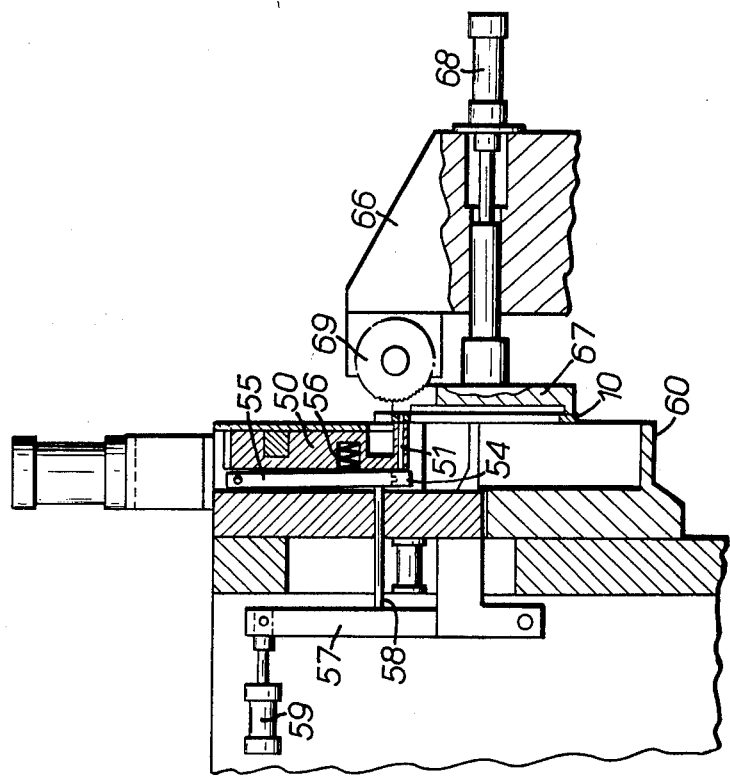
FIG. 16 is a cross-sectional view of the apparatus in the condition shown in FIG. 15 and showing a sawing unit.
Figure 15:
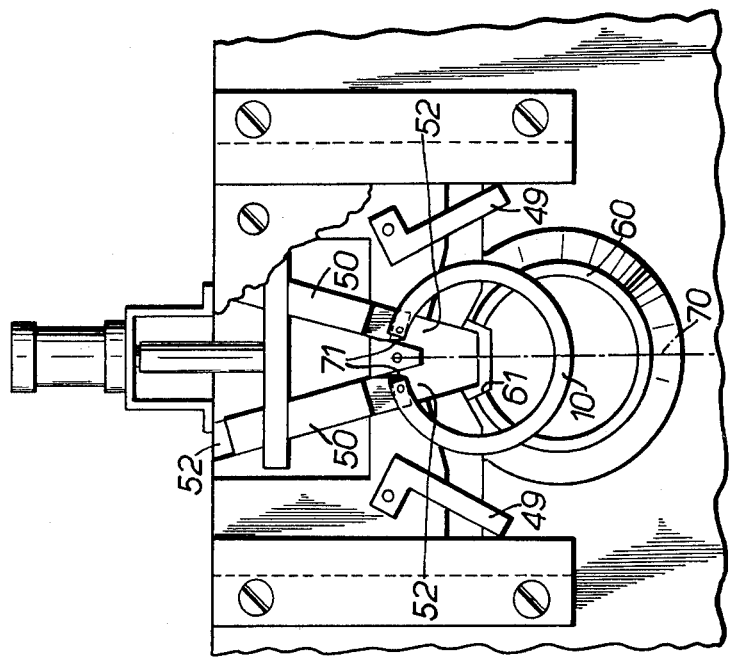
FIG. 15 is a similar view to FIG. 13 but showing the piston ring blank with a gap cut therein.

The drilling unit 63 is then retracted, and a sawing unit 66 is next employed (see FIGS. 15 and 16). A ring blank clamping plate 67 and actuator 68 clamp the ring blank 10 against the surface of the base 60 and of the ends of the slides 50, as described above with reference to FIGS. 13 and 14. The orientation rod 48 is then withdrawn by operation of an actuator, and ways 49 are also withdrawn. The gap is then cut, for example, by two circular saws 69 (see FIG. 16), positioned one on each side of the axis of symmetry, so that the portion of the blank 10 containing the notch or projection 12 is removed. The clamping plate 67 is then released.

The two slides 50 are then moved on their converging slideways 52, until their opposed faces 71, which serve as stops, come into contact with one another. Thus, by means of the projecting pins 51, the ring blank is brought to the closed position, in which the gap is reduced (or the free ends 15 are lightly in abutment with one another). Moreover, the ring blank 10 is, by this movement of the slides 50, brought to a position in which it is substantially in register with the base 60 (though the radial thickness of the base 60 will be less than that of the ring blank, to allow for machining). The ends of the slides 50 substantially fill the cut-out portion 61 (and the radial thickness of these ends will also be less than that of the ring blank). The movement of the slides may be snychronised as described for the previous embodiment or in any convenient way.

Figure 17:
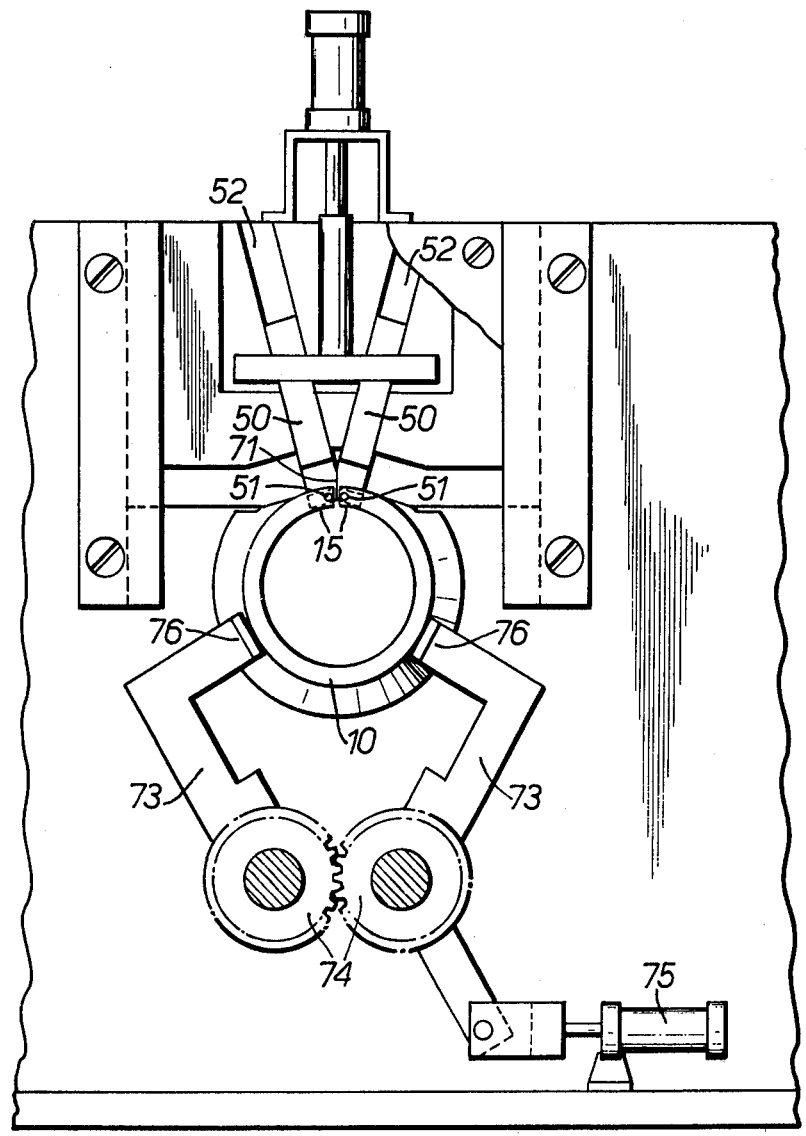
FIG. 17 is a similar view to FIGS. 13 and 15 but showing the piston ring blank in a position to be clamped and machined and a pair of arms for centering the ring.

With the ring blank 10 in its closed position, supported against base 60 by pins 51, it is centralised by means of a centralising unit shown in FIG. 17 which consists of a pair of meshing gears 74 mounted to rotate in bearings (not shown) and carrying respective arms 73. An actuator 75 is connected to one of the gears 74 to cause the arms 73 to move symmetrically, by virtue of the meshing teeth of the gears 74, on either side of a plane in which lies the desired position of the centre of the ring blank 10, said plane being normal to the plane of the base 60. The free ends 76 of the arms are arranged to contact the ring blank 10 at positions angularly spaced by approximately 120 degrees from the free ends 15 supported on pins 51, so as to centralise the blank 10.

Referring next to FIG. 18, a turning and boring unit 78 is next aligned with the central axis of the ring blank 10. The unit 78 as a whole is movable towards and away from the ring blank 10, for example on slides. The machining head of this unit has three concentric parts. The inner part 79 and the outer part 81 are secured together, and are mounted in a sliding member 82 by means of bearings 83. The outer part 81 carries a sleeve 84 slidable within it against a coil spring 85.

An intermediate annular clamping part 80 is journalled within the outer part 81, is rotatable relative to the inner and outer parts, and has a thrust bearing 86 between itself and the sleeve 84. The intermediate part 80 has a first annular portion 80a including an annular clamping face 87 of substantially the same mean radius and thickness as the base 60. The portion 80a has a convex part-spherical face 88 engaging with a concave part-spherical face 89 on a second annular portion 90 of the intermediate part 80; the common center of these faces lying in the plane of the clamping face 87.

The inner part 79 has a boring tool 91 and the outer part 81 has a turning tool 92 at their ends near the annular clamping face of the intermediate part 80.

In operation, the unit 78 is advanced towards the ring blank 10 and the face 87 engages the ring blank 10 to press and clamp the ring blank 10 against the base 60 and the surfaces of the lower ends of the slides 50. The arms 73 are withdrawn either before this engagement or as the engagement occurs. Continued movement of the unit 78 clamps the side faces 11 of the ring blank 10 between the clamping face 87 and the base 60, which forms a stationary clamping member. The clamping force is partly supplied by the spring 85.

The inner and outer parts 79, 81, including sleeve 84 and coil spring 85, are rotated by any convenient form of drive, and, as the unit 78 is advanced further, the boring tool 91 machines the inner periphery and the turning tool 92 machines the outer periphery of the ring blank 10 traversing across the width of the ring blank. The advance of the unit 78 compresses the spring 85 within sleeve 84, and thus causes an increased clamping force to be exerted through the thrust bearing 86 and the intermediate part 80 on the ring blank 10.

The part-spherical mating faces 88, 89 allow the face 87 to bear evenly on the ring blank 10 around its whole circumference even if the axis of the face 60 is not exactly in alignment with the axis of the intermediate part 80. The boring tool 91 and the turning tool 92 cut at respective points on the surfaces of the ring blank, the points lying on a common radius of the ring blank as they rotate around the ring blank. This ensures that the tools apply no net radial forces to the ring blank.

If desired, there may be provided a rough turning and boring unit, followed by a fine turning and boring unit; as a result of the retraction of part 80, the ring blank 10 will be unclamped between the operation of the former and of the latter unit. Any "features" such as grooves, steps, bevels, etc., may also be machined by means of a suitable tool in a similar way.

It will, however, be seen that in comparison with machines in which the internal and external peripheries are located by means of cones while the external and internal peripheries are machined consecutively, the number of operations is halved and the machining time greatly reduced. In addition, using the apparatus just described, a better approximation to true circular form may be obtained with one machining operation, than is obtained after machining the inside and outside peripheries consecutively.

Piston rings with a circularity of better than three microns have been produced.

It has been found that with rings manufactured as described above with reference to the drawings, the resilient action of the ring against the cylinder bore is maintained around the entire periphery for a longer time, in terms of the wear of the cylinder bore, than with a conventional ring. For example, with a 60 mm diameter rings, as described, a conventional ring may maintain good sealing contact for an increase in cylinder bore size of 0.15 mm on diameter. It has been found that rings made in accordance with the present invention retain good sealing characteristics until about double this amount of wear has taken place.

In addition, the fact that the rings may be machined by normal turning to circular form, rather than on a special machine designed to give a particular non-circular form, tends to reduce the cost of machining.

Instead of the holes being drilled wholly through the axial width of the ring, where the ring is of sufficient width, the holes may be drilled part way only through the width. The criterion is that the pins, whether mounted on a hand tool or on a face of a machine tool, when inserted in the holes, should have sufficient bearing area to enable the gap to be maintained at the predetermined closed dimension. Moreover where the holes are drilled through the entire width of the ring, pins may be inserted in the holes with an interference fit, the projecting portion of the pins enabling the gap to be closed by a suitable tool or slides, and the projecting portion then being ground off.

It will be appreciated that before the ring blank 10 is clamped, it is free from distortions caused by radially directed forces and it may be clamped in this state, as described above. Alternatively, the ring blank may be radially deformed by predetermined radially directed forces before being clamped; the radial deformation being held by the clamping. The radial deformations are chosen so that, after the inner and outer peripheries have been machined to be circular and the ring blank unclamped to release the radial deformations, the peripheries of the ring have a required shape for the insertion of the finished ring in a cylinder bore. For example, finished rings may be produced in this way in which the free ends of the ring depart from true circular form either inwardly, e.g. diesel engines, or outwardly, e.g. petrol engines.

Alternatively, rings having such inwardly and outwardly extending ends may be made by machining a ring blank without radial deformations to be circular but of greater or lesser diameter respectively than the diameter of the cylinder bore.

Other variations within the scope of the invention will be apparent to those skilled in the art.

I claim:

1. A method of manufacture of a piston ring, including the following steps:
    making a ring blank of which the diameter over the outer periphery is greater, and the diameter within the inner periphery is less than that required in the finished ring and of which the side faces are parallel;
    drilling two holes in the ring blank;

engaging two substantially parallel pins set at a predetermined spacing in the drilled holes to locate the ring blank in a condition in which the ring blank is unstressed by external forces;

cutting a gap in the ring blank either before or after the drilling step to afford two free ends, the positions of the holes being such that each hole is adjacent an associated free end;

reducing the spacing of the pins to hold the ring blank in a closed position;

clamping the so held ring blank in a closed position between said side faces while the ring blank is on the pins, said ring blank being clamped so as to expose the entire inner and outer peripheries of the ring blank; and then machining the inner and outer peripheries of the ring blank to be circular.

2. A method as claimed in claim 1 and comprising, after the step of holding the ring blank in the closed position, applying one or more radially directed forces to the ring blank to deform the ring blank, the ring blank being clamped in said closed position and said deformed condition and the or each force being such that the ring blank, after being machined to the circular and after being unclamped to allow relaxation, has a predetermined peripheral profile.

3. A method as claimed in claim 1 and comprising drilling a hole simultaneously and then extending the two pins simultaneously.

4. A method as claimed in claim 1 and comprising, before clamping the ring blank or blanks, centering the ring blank or blanks for the machining step by moving two arms from a retracted position, in which the arms are equally spaced on either side of a plane in which lies the required position of the centre of the closed ring blank or blanks, when clamped, and which is normal to the plane or planes of the ring blank or blanks, by equal amounts to a position in which the arms engage the ring blank or blanks to centre the ring blank or blanks.

5. A method as claimed in claim 1 and comprising engaging the pins with the holes in the ring blank by extending the pins from retracted positions, in which the pins are aligned with the axes of respective drilled holes and in which the pins are out of engagement with the ring blank, to extended positions in which the pins engage the drilled holes.

6. A method of manufacture of a piston ring, including the following steps:

making a ring blank of which the diameter over the outer periphery is greater, and the diameter within the inner periphery is less than that required in the finished ring;

cutting a gap in the ring blank to afford two free ends;

engaging two substantially parallel pins set at a predetermined spacing on each of the free ends of the ring blank;

holding the ring blank in a closed position by the application of a force only to each of the pins on the free ends of the ring blank;

clamping the so held ring blank in a closed position between a stationary clamping member and an annular clamping member forming a part of a machining head, the machining heads being movable towards the held ring blank to bring the annular clamping member into engagement with the ring blank to clamp the ring blank while the ring blank is on the pins, said ring blank being clamped so as to expose the entire inner and outer peripheries of the ring blank; and then machining simultaneously the interior and exterior peripheries of the clamped ring blank to be circular, by respective boring and turning tools carried on respective inner and outer parts of the machining head, said inner and outer parts of the machining head being coaxial with, and arranged respectively within and outside the annular clamping member, being movable axially relative to said annular clamping member, after the annular clamping member has engaged the ring blank and being rotatable relative to the annular clamping member to perform said machining step.

7. A method as claimed in claim 6 wherein said machining step comprises rotating the boring and turning tools in synchronism in contact with respective points on the interior and exterior peripheries of the ring blank respectively, said points lying on a common radius of the ring blank, while rotating around the ring blank.

* * * * *